(12) United States Patent
Bima et al.

(10) Patent No.: US 12,218,522 B2
(45) Date of Patent: Feb. 4, 2025

(54) LAYERED DOUBLE-D COIL FOR WIRELESS POWER TRANSFER SYSTEMS

(71) Applicant: Tennessee Technological University, Cookeville, TN (US)

(72) Inventors: Muhammad E. Bima, Atlanta, GA (US); Indranil Bhattacharya, Cookeville, TN (US)

(73) Assignee: Tennessee Technological University, Cookeville, TN (US)

( * ) Notice: Subject to any disclaimer, the term of this patent is extended or adjusted under 35 U.S.C. 154(b) by 0 days.

(21) Appl. No.: 18/513,098

(22) Filed: Nov. 17, 2023

(65) Prior Publication Data
US 2024/0097500 A1 Mar. 21, 2024

Related U.S. Application Data

(63) Continuation of application No. 17/554,119, filed on Dec. 17, 2021, now Pat. No. 11,837,884.
(Continued)

(51) Int. Cl.
*H02J 50/40* (2016.01)
*H01F 27/36* (2006.01)
(Continued)

(52) U.S. Cl.
CPC .......... *H02J 50/402* (2020.01); *H01F 27/366* (2020.08); *H02J 50/10* (2016.02); *H02J 50/70* (2016.02)

(58) Field of Classification Search
CPC .......... H02J 50/402; H02J 50/10; H02J 50/70; H01F 27/366
(Continued)

(56) References Cited

U.S. PATENT DOCUMENTS

| | | | |
|---|---|---|---|
| 7,844,306 B2 * | 11/2010 | Shearer | H02J 50/80 455/343.1 |
| 7,986,059 B2 * | 7/2011 | Randall | H02J 50/10 320/108 |

(Continued)

FOREIGN PATENT DOCUMENTS

| | | |
|---|---|---|
| CN | 102231313 B | 4/2014 |
| DE | 10112460 B4 | 6/2007 |

OTHER PUBLICATIONS

Bima et al., "Comparative Analysis of Magnetic Materials, Coil Structures and Shielding Materials for Efficient Wireless Power Transfer," 2019 IEEE International Symposium on Electromagnetic Compatibility, Signal & Power Integrity (EMC+SIPI), pp. 95-100, Jul. 22, 2019.

(Continued)

*Primary Examiner* — Alfonso Perez Borroto
(74) *Attorney, Agent, or Firm* — André J. Bahou; Kristen Strickland; Bradley Arant Boult Cummings LLP

(57) ABSTRACT

A wireless power transfer device is disclosed that includes at least a first coil layer and a second coil layer, each coil layer including two coil windings positioned adjacent to one another in a lateral direction; wherein the two coil windings in each corresponding coil layer are connected in series and are wound in the same rotational direction, and the first and second coil layers are stacked in layers on top of one another. The magnetic fields of the coil layers can interact with one another in a constructive manner such that the overall efficiency and power transmission of the wireless power transfer device can be enhanced.

20 Claims, 6 Drawing Sheets

Related U.S. Application Data

(60) Provisional application No. 63/126,944, filed on Dec. 17, 2020.

(51) Int. Cl.
  *H02J 50/10* (2016.01)
  *H02J 50/70* (2016.01)

(58) Field of Classification Search
  USPC .......................................................... 307/149
  See application file for complete search history.

(56) References Cited

U.S. PATENT DOCUMENTS

| | | | |
|---|---|---|---|
| 8,416,721 B1 * | 4/2013 | Chen | H04W 52/0209 |
| | | | 370/310 |
| 8,803,649 B2 | 8/2014 | Singh et al. | |
| 9,352,661 B2 | 5/2016 | Keeling et al. | |
| 9,431,834 B2 | 8/2016 | Keeling et al. | |
| 9,620,281 B2 | 4/2017 | Covic et al. | |
| 9,672,976 B2 | 6/2017 | Levo et al. | |
| 9,698,608 B2 | 7/2017 | Keeling et al. | |
| 9,966,797 B2 | 5/2018 | Covic | |
| 10,027,147 B2 | 7/2018 | Islinger et al. | |
| 10,141,748 B2 | 11/2018 | Kautz et al. | |
| 10,144,302 B2 | 12/2018 | Samuelsson et al. | |
| 10,263,471 B2 | 4/2019 | Maniktala | |
| 10,358,045 B2 | 7/2019 | Budhia et al. | |
| 10,414,279 B2 | 9/2019 | Kautz et al. | |
| 10,424,967 B2 | 9/2019 | Covic et al. | |
| 10,636,563 B2 | 4/2020 | Peralta et al. | |
| 10,658,847 B2 | 5/2020 | Peralta et al. | |
| 10,668,829 B2 | 6/2020 | Von Novak et al. | |
| 10,693,321 B2 | 6/2020 | Cheng et al. | |
| 10,720,277 B2 | 7/2020 | Budhia et al. | |
| 10,726,989 B2 | 7/2020 | Furiya et al. | |
| 10,749,380 B2 | 8/2020 | Wilson | |
| 10,784,044 B2 | 9/2020 | Qi et al. | |
| 2011/0175461 A1 * | 7/2011 | Tinaphong | H02J 50/27 |
| | | | 307/149 |
| 2013/0154387 A1 * | 6/2013 | Lee | H02J 50/12 |
| | | | 307/104 |
| 2014/0370882 A1 * | 12/2014 | Liu | H04W 16/14 |
| | | | 455/552.1 |
| 2016/0372974 A1 * | 12/2016 | Chen | H04B 5/79 |

OTHER PUBLICATIONS

Bima et al., "Experimental Evaluation of Layered DD Coil Structure in a Wireless Power Transfer System," IEEE Transactions on Electromagnetic Compatibility, pp. 1477-1484 Vol. 62, No. 4, Aug. 2020.

* cited by examiner

LAYERED DOUBLE-D COIL FOR WIRELESS POWER TRANSFER SYSTEMS

CROSS-REFERENCES TO RELATED APPLICATIONS

This application is a continuation of U.S. patent application Ser. No. 17/554,119 filed Dec. 17, 2021, entitled LAYERED DOUBLE-D COIL FOR WIRELESS POWER TRANSFER SYSTEMS, which is a non-provisional of U.S. patent application Ser. No. 63/126,944 filed Dec. 17, 2020, entitled LAYERED DOUBLE-D COIL FOR WIRELESS POWER TRANSFER SYSTEMS, which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

BACKGROUND

The present disclosure relates generally to wireless power transfer systems.

Wireless power transfer can be best summarized as the transmission of electrical energy between a transmitter and receiver device without the use of wires as a physical link between the devices. Recently, wireless power transfer has gained widespread usage among small consumer electric products like toothbrushes, shavers, cellphones, tablet computers, etc. It is also being used to charge other electric products such as specialized biomedical prosthetic implants and electric vehicles. The transfer efficiency of a wireless power transfer system is a critical and desired property for faster dynamic charging of electric vehicles, portable electronics, and battery powered medical devices.

Generally, wireless power transfer systems can be broken down into two main subcategories: near-field and far-field methods. Inductive wireless power transfer, one particular subset of near-field methods, is particularly relevant to the layered DD coil structure disclosed herein. With inductive wireless power transfer, power is transferred between wire coil structures by a magnetic field. Today's conventional inductive wireless power transfer systems generally have two main challenges limiting their more widespread adoption into new and emerging technologies: efficiency and quantity of power transfer over a large area (i.e., range of application). In most cases, with conventional systems, only a low amount of power is capable of being transferred with high efficiency. Another concern associated with conventional systems is the health hazard associated with longer exposure to the magnetic flux lines associated with inductive wireless power transfer systems. It is necessary to shield the amount of magnetic flux that leaks out of the system.

What is needed then are improvements in inductive wireless power transfer systems that can transfer power maximally and most efficiently, with minimal leakage of magnetic flux into the surrounding environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a wireless power transfer device that includes at least a first coil layer and a second coil layer, each coil layer including two coil windings positioned adjacent to one another in a lateral direction; wherein the two coil windings in each corresponding coil layer are connected in series and are wound in the same rotational direction, and the first and second coil layers are stacked in layers on top of one another. The magnetic field of the coil layers can interact with one another in a constructive manner such that the overall efficiency and power transmission of the wireless power transfer device can be enhanced.

Another aspect of the present disclosure is a wireless power transfer device including a first coil layer having a first pair of coil windings positioned laterally adjacent to one another, wherein the first pair of coil windings are connected in series to one another and wound in the same rational direction. The device can include a second coil layer having a second pair of coil windings positioned laterally adjacent to one another, wherein the second pair of coil windings are connected in series to one another and wound in the same rational direction. The first coil layer can be stacked on the second coil layer in a direction transverse to the lateral direction.

Having the coil windings in each layer connected in series and wound in the same rotational direction with respect to the direction of current flow through the coil windings can produce a divergent, opposing, or repellant magnetic interaction between the coil windings of a coil layer in a direction transverse to the lateral direction, which can help increase the range of the magnetic flux produced by an individual coil layer. In some embodiments, the first and second coil layers can be configured such that all coil windings of the wireless power transfer device can be wound in the same rotational direction with respect to the flow of current through the coil windings, such that the magnetic fields in each coil layer interfere constructively with respect to the magnetic fields produced in the other coil layers. The constructive nature of the magnetic fields of the different coil layers can help increase the range, transmission power, and transmission efficiency of the wireless power transfer device. The layering of the DD coils in the wireless power transfer device can also help minimize the lateral space or area occupied by the wireless transfer device, which can help provide an increased power transmission without substantially increasing the lateral space or footprint of the power transfer device.

The specific contribution of this disclosure is in the implementation of a LDD coil structure with a coil orientation that utilizes the internal mutual inductance between the coil layers. In this context, the present LDD coil achieves a higher inductance value in a smaller area. This was done by orienting the individual layers such that the current traveling through the layers will generate magnetic fields in each coil layer that would add up constructively thereby contributing to the overall inductance of the coil. In addition to other features disclosed herein, at least three key features are recognized from the present LDD coil configuration: (1) the LDD coil orientation in each layer is oriented in such a manner that the flux generated by each layer adds up constructively with those of other layers, thereby helping to increase the overall mutual inductance of the coil; (2) the present implementation of vertical inductance helps improve the power transfer of the wireless power transfer device; and (3) the LDD coil helps improve the power transfer efficiency of the wireless power transfer device.

Numerous other objects, advantages and features of the present disclosure will be readily apparent to those of skill in the art upon a review of the drawings and description of a preferred embodiment.

DETAILED DESCRIPTION

Figure 1:
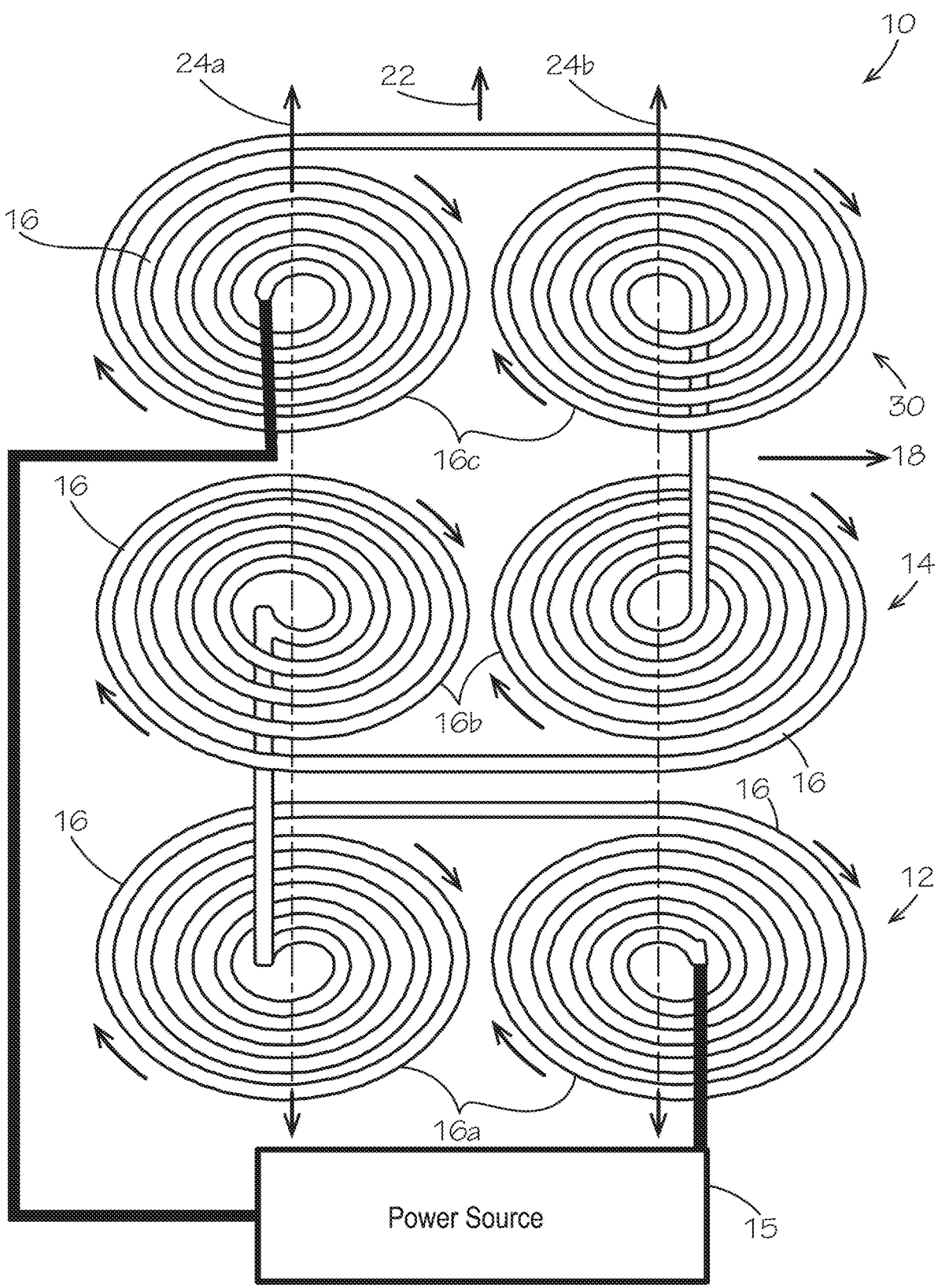
FIG. 1 is a schematic view of a transmitter coil of a wireless power transfer device of the present disclosure showing flow paths of current through various coil layers and coil windings of the wireless power transfer device.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Figure 2:
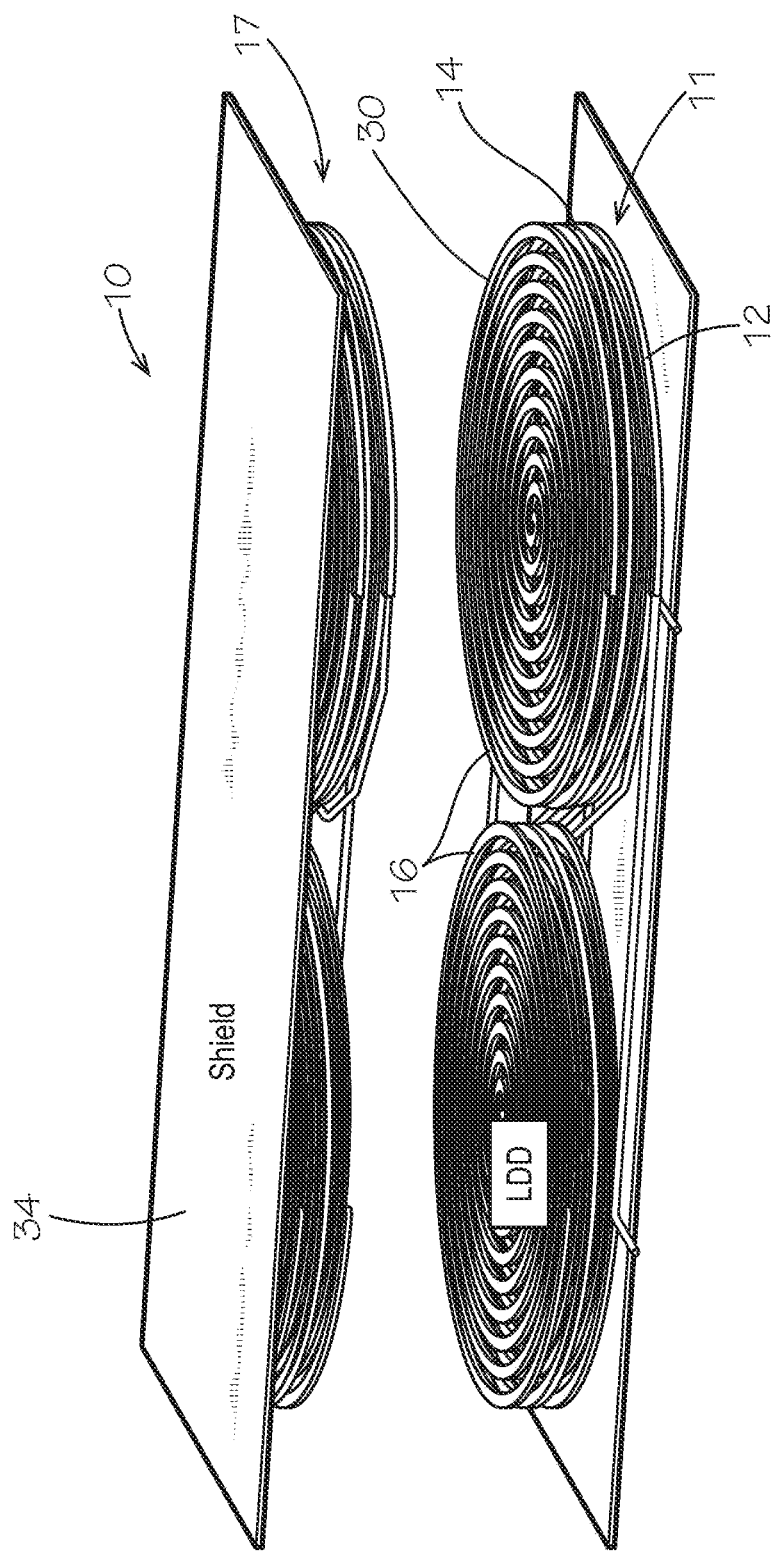
FIG. 2 is a perspective view of another embodiment of a wireless power transfer device having a layered DD transmitter coil and a layered DD receiver coil and magnetic shield layers on outer sides of each of the transmitter and receiver coils.
Figure 3:
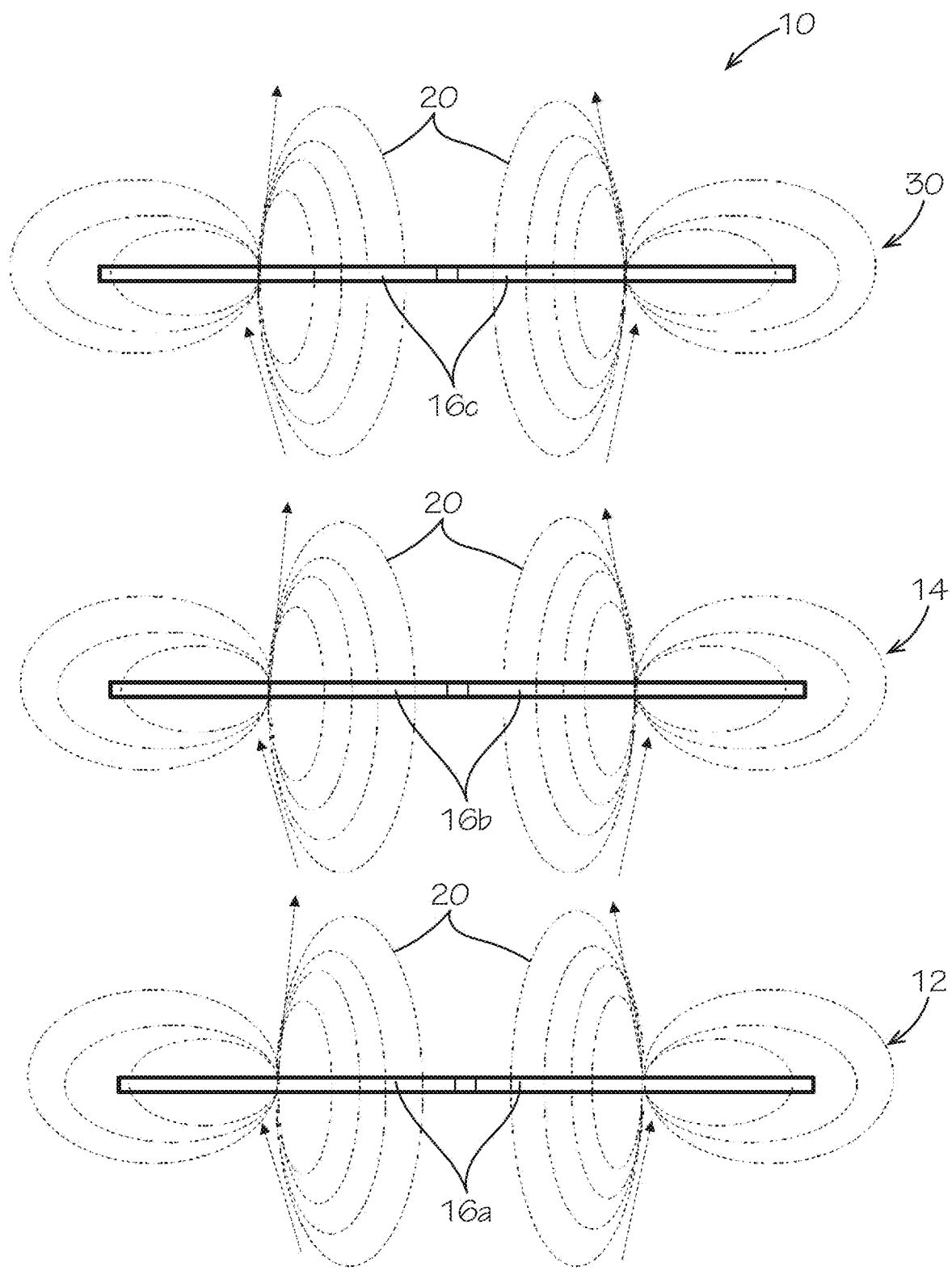
FIG. 3 depicts a side view of the wireless power transfer device of FIG. 1 showing the diverging magnetic fields produced in each coil layer separately.

As shown in FIGS. 1-4, one aspect of the present disclosure is a wireless power transfer device 10 that includes at least a first coil layer 12 and a second coil layer 14, each coil layer including two coil windings 16 positioned adjacent to one another in a lateral direction 18; wherein the two coil windings 16 in each corresponding coil layer 12 and 14 are connected in series and are wound in the same rotational direction, and the first and second coil layers 12 and 14 are stacked in layers on top of one another. The magnetic fields of the coil layers 12 and 14 can interact with one another in a constructive manner such that the overall efficiency and power transmission of the wireless power transfer device 10 can be enhanced. The wireless power transfer device 10 in FIG. 1 depicts a transmitter coil 11 connected to a power source 15 for transferring power to a receiver coil 17, as shown in FIG. 2. In some embodiments, a wireless power transfer device 10 can include only a transmitter coil 11 that can be configured to interact and transfer power via induction to various receiver coils 15 that come into close enough proximity to the magnetic fields generated by the transmitter coil 11.

Another aspect of the present disclosure is a wireless power transfer device 10 including a first coil layer 12 having a first pair of coil windings 16a positioned laterally adjacent to one another, wherein the first pair of coil windings 16a are connected in series to one another and wound in the same rational direction. The device 10 can include a second coil layer 14 having a second pair of coil windings 16b positioned laterally adjacent to one another, wherein the second pair of coil windings 16b are connected in series to one another and wound in the same rational direction. The first coil layer 12 can be stacked on the second coil layer 14 in a direction 22 transverse to the lateral direction 18.

Having the coil windings 16 in a coil layer 12 or 14 oriented laterally adjacent to one another can mean that the coil windings 16 are each wound about corresponding axes 24a and 24b that are substantially parallel and separate from one another, such that the coil windings 16 in a coil layer 12 or 14 are oriented in a side by side orientation. In some embodiments, one coil winding 16 from each coil layer 12 and 14 can be wound about the same axis 24b and the other coil windings 16 in each coil layer 12 and 14 can be wound around the other axis 24b, the that corresponding coil windings in successive coil layers 12 and 14 can be vertically aligned with one another.

Figure 4:
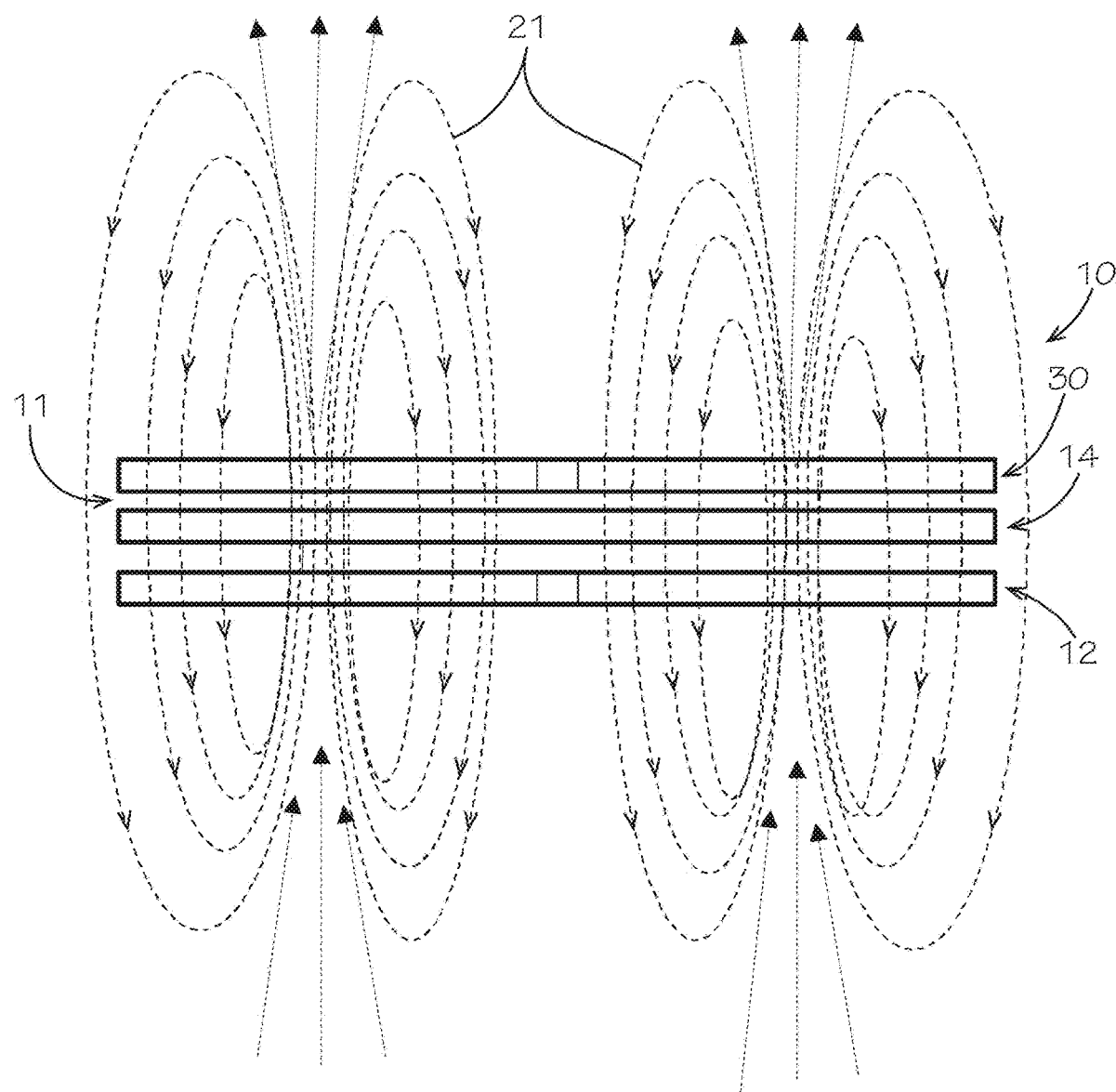
FIG. 4 shows the overall magnetic field distribution of the wireless power transfer device of FIG. 1.

Having the coil windings 16 in each corresponding coil layer 12 or 14 connected in series and wound in the same rotational direction with respect to the direction of current flow through the coil windings 16 can produce a divergent or repellant magnetic interaction between the coil windings 16 of a coil layer 12 or 14, which can help increase the range of the magnetic flux produced by an individual coil layer 12 or 14. In some embodiments, the first and second coil layers 12 and 14 can be configured such that all coil windings 16 of the wireless power transfer device 10 can be wound in the same rotational direction with respect to the flow of current through the coil windings 16, such that the magnetic fields 20 in each coil layer 12 or 14 interfere constructively with respect to the magnetic fields 20 produced in the other coil layers 12 or 14, respectively, as shown in FIG. 4. Magnetic fields interfering constructively with one another can mean that while there may be some converging of the interfering magnetic fields at certain points along the wireless power transfer device 10, the overall mutual inductance of the layered coil layers 12 and 14 can be increased as opposed to decreased, when the coil layers 12 and 14 are stacked together, and particularly along the axes 24a and 24b of vertically aligned coil windings 16, as shown in FIGS. 4 and 5.

As shown in FIG. 1, in some embodiments all coil windings 16 in the first and second coil layers 12 and 14 can be wound in a clockwise direction with respect to the flow of current through the coil windings 16. It will be readily appreciated that the coil windings 16 could be wound in either a clockwise or counterclockwise direction, provide that all coil windings 16 are wound in the same rotational directional, and the resulting magnetic fields and fluxes produced by the transmission coil 11 of the device 10 would be substantially equivalent, but reversed in polarity. The constructive nature of the magnetic fields 20 of the different coil layers 12 and 14 can help increase the range, transmission power, and transmission efficiency of the wireless power transfer device 10. The layering of the DD coils in the wireless power transfer device 10 can also help minimize the lateral space or area occupied by the wireless power transfer device 10, which can help provide an increased power transmission without substantially increasing the lateral space or footprint of the power transfer device 10.

In some embodiments, each of the first and second coil layers 12 and 14 can be interconnected in series, such that not only are the coil windings 16 in each layer connected in series, but the various coil layers 12 and 14 are also connected in series. As such, the entire transmitter coil 11 and all of the coil layers 12 and 14 can be powered by a single power source 15. The coil windings 16 in the wireless power transmission device 10 can be wound in the same rotational direction relative to the current flowing through the coil windings 16 connected in series. In other embodiments, the coil layers 12 and 14 can be connected in parallel to one another on parallel electrical paths, but again the coil windings 16 can be wound in the same direction with respect to the flow of current through a given parallel line of the transmitter coil 11 wiring. In still other embodiments, the coil layers 12 and 14 can be powered by separate power sources, though the coil windings in all separately powered layers can be wound in the same rotational direction with respect to the current flowing through the coil layers, such that the magnetic fields in each subsequent coil layer have like polarities.

It will be readily appreciated that various numbers of coil layers having the orientations taught for the first and second coil layers 12 and 14 can be utilized to further increase the mutual inductance and transmission power of the wireless power transfer device 10. For instance, as shown in FIGS. 1-4, in some embodiments, the wireless power transfer device 10 can include a third coil layer 30 stacked on the first and second coil layers 12 and 14. The third coil layer 30 can have a third pair 16c of coil windings 16 positioned adjacent to one another in a lateral direction, connected in series, and wound in the same rotational direction. In some embodiments, all coil windings 16 of the first, second, and third coil layers 12, 14, and 30 of the wireless power transfer device 10 can be wound in the same rotational direction with respect to the flow of electricity through the coil windings 16, such that the coil windings 16 in each corresponding coil layer 12, 14, or 30 produce a diverging magnetic field 20 in a direction transverse to the lateral direction 18, and the magnetic field 20 produced in each coil layer interferes constructively with the corresponding magnetic field 20 produced by the corresponding coil windings 16 of the other coil layers 12, 14, or 30 respectively.

As noted previously, one problem with wireless power transmission devices 10 can be exposure of people or other electronic circuitry (car electrical systems) to the magnetic fields 20 produced via the transmitter coil 11 of the transfer device 10. To prevent against this exposure, in some embodiments, as shown in FIGS. 2 and 5, the wireless power transfer device 10 can be equipped with one or more magnetic shield layers 32 and/or 34. In some embodiments, a magnetic shield layer 32 can be located or positioned adjacent an outermost one of the first, second, or third coil layers 12, 14, or 30. The magnetic shield layer 32 can be positioned so as not to interference with the extension of the magnetic field 20 produced by the transmitter coil 11 in a direction toward the receiver coil 17, but can help block or shield the magnetic field 21 of the transmitter coil 11 on a side of the transmitter coil 11 opposite the receiver coil 17.

The magnetic shield layer 32 can be made of a variety of materials, including but not limited to ferrite, neodymium, nickel, nickel-iron, steel, cobalt-iron, aluminum, etc. In one embodiment, ferrite is used for the magnetic shield layer 32, as ferrite has been shown to demonstrate significant shielding properties for the magnetic shield, as shown in FIG. 5.

In some embodiments, a receiver coil 17 can be spaced apart from the transmitter coil 11, and the magnetic shield layer can be located on a side of the transmitter coil 11 opposite the receiver coil 17. In some embodiments, the wireless power transfer device can include a receiver magnetic shield layer 34 positioned on a side of the receiver coil 17 opposite from the transmitter coil 11. As such, magnetic shield layers 32 and 34 can be placed on corresponding outer sides of both the transmitter coil 11 and the receiver coil 17, to allow power transfer between the transmitter and receiver coils 11 and 17, but the magnetic shield layers 32 and 34 can help prevent the magnetic fields 21 produced by the wireless power transfer device 10 to extend beyond the device 10 which can reduce exposure of nearby persons or electronic circuitry to such magnetic fields 21.

Mutual and self-inductance are two parameters that influence the transfer efficiency of a wireless power transfer device 10. The impact of parameters such as coil structure, electromagnetic shielding, coupling coefficient, and mutual inductance upon the system's efficiency and quantity of power transfer over a large area have been studied. It has been learned that it is helpful to increase the mutual inductance between the coils to achieve high efficiency and power in wireless power transfer systems. The higher the mutual inductance between the coils, the more easily the coils will transmit power. The self-inductance determines the power density, which can be referred to as the amount of power the coil can store. The coupling factor also determines how well the coils will behave in wireless power transfer applications. To achieve an improved inductance, various types of coil structures, shielding materials, orientations, and configurations have been employed in current systems, chiefly including circular, double D (DD), DD quadrature (DDQ), and layered DD (LDD) coil structures. LDD coil structures having coil windings wound in the same rotational direction with respect to the current flowing through the coil windings were found to have an enhanced performance when compared to the other structures due to two things: (1) the improved inductance and power transmission of the device while maintaining the same lateral area or footprint of the device, and (2) the current path generates a resultant magnetic field that constructively results in an overall improvement in the magnetic field around the transmitter coil of the wireless power transfer device 10. To achieve an increase in inductance, coils are conventionally wound with more turns, therefore, making them bigger and not being able to fit into a fixed or limited area. Rather than making bigger and bigger coil structures, implementing a layered coil configuration, like the embodiment of a LDD coil shown in FIGS. 1-2, helps to account for size constraints and creates maximum flux linkage between the transmitting and receiving coils of the wireless power transfer device 10. The disclosed LDD coil also increases the effective power transmission area or range while maintaining the same lateral area or footprint of the device 10.

Prior art layered inductive coil orientations do not optimize self-inductance and mutual inductance values by having the coil windings wound in the same rotational direction as taught herein. However, in the embodiment of the LDD coil depicted in FIG. 1, self-inductance values have been enhanced in the horizontal direction and mutual inductance values are enhanced in the vertical direction in an effort to maximize the mutual inductance values of the transmission coil 11.

The coil winding structure shown in FIGS. 1-2 helps increase the efficiency and amount of power transfer for all types of wireless power transfer applications.

The software simulation tool ANSYS Maxwell was used to model and test the LDD coils disclosed herein. In one embodiment, the LDD coil can be made from Litz wire 14 AWG and comprise three interconnected vertical layers, each spaced five millimeters apart. Within each interconnected layer, the Litz wire is wound into a circular-spiral shape with a starting radius of ten millimeters and a total of ten turns, wherein each turn has a change in radius of five millimeters. For shielding, aluminum and ferrite sheets were used in the simulation shown in FIG. 5 to improve the overall influence on the flux lines. As modeled in the ANSYS Maxwell simulation, shielding with dimensions of 120 mm×260 mm×1 mm was placed both below the transmitter and above the receiver, covering their respective surface areas.

In addition to the ANSYS Maxwell virtual simulation, a physical experimentation was also performed, wherein the DD and layered DD coils taught in the present disclosure where constructed, and current was supplied to the transmitter coil via a function generator, and the electrical waveforms induced in the receiver coil was measured using an oscilloscope. The physical experimentation was performed under similar parameters as those used in the ANSYS Maxwell virtual simulation. The coil terminals of each layer are excited or terminated such that the coil windings in each coil layer produce diverging, opposing, or repelling magnetic fields 20, or the mutual regions between the coil windings generate an opposing or repelling magnetic field. Such a configuration was found to lead to a minimization of the mutual inductance within the coil layers but constructively add magnetic flux lines across successive coil layers to provide a higher amount of mutual inductance between the transmitting and receiving coils than any of the individual constituting DD coils put together. This concept increases the efficiency and amount of power transfer for all kinds of wireless power transfer applications. The comparison of the received power transmission and efficiencies of the single DD coil and layered DD coils of the present disclosure are shown in Tables I and II below:

TABLE I

MAXIMUM RECEIVED POWER

| Material | g(mm) | $P_{DD}$ (W) | $P_{LDD}$ (W) |
|---|---|---|---|
| Air | 15.24 | $4.69 \times 10^{-3}$ | $7.49 \times 10^{-3}$ |
| Air | 40.64 | $9.21 \times 10^{-4}$ | $8.58 \times 10^{-3}$ |
| FE1 | 15.24 | $4.74 \times 10^{-3}$ | $7.47 \times 10^{-3}$ |
| FE1 | 40.64 | $8.05 \times 10^{-4}$ | $5.28 \times 10^{-3}$ |
| FE2 | 15.24 | $5.10 \times 10^{-3}$ | $8.12 \times 10^{-3}$ |
| FE2 | 40.64 | $1.06 \times 10^{-3}$ | $5.55 \times 10^{-3}$ |
| AL1 | 15.24 | $1.02 \times 10^{-3}$ | $5.78 \times 10^{-3}$ |
| AL1 | 40.64 | $1.33 \times 10^{-4}$ | $1.81 \times 10^{-3}$ |
| AL2 | 15.24 | $3.57 \times 10^{-4}$ | $4.30 \times 10^{-3}$ |
| AL2 | 40.64 | $3.04 \times 10^{-5}$ | $5.23 \times 10^{-4}$ |

TABLE II

EFFICIENCY AT MAXIMUM POWER

| Material | g(mm) | Ef $f_{DD}$ (%) | Ef $f_{LDD}$ (%) |
|---|---|---|---|
| Air | 15.25 | 61.80 | 91.1 |
| Air | 40.64 | 47.07 | 93.56 |
| FE1 | 15.24 | 81.13 | 92.16 |
| FE1 | 40.64 | 34.33 | 91.84 |
| FE2 | 15.74 | 88.19 | 73.96 |
| FE2 | 40.64 | 49.23 | 74.23 |
| AL1 | 15.24 | 31.12 | 99.99 |
| AL1 | 40.64 | 4.42 | 27.18 |
| AL2 | 15.24 | 14.34 | 51.51 |
| AL2 | 40.64 | 0.732 | 10.75 |

As can be seen from the tables, the LLD coil of the present disclosure offered increased power transmission and efficiency over the single D coil. In contrast, in a similar prior experiment, a layered DD coil was tested against various coil structures, including a single layer DD coil, wherein the coil windings for each coil layer of the layered DD coil were wound in opposite rotational directions with respect to the flow of current through the windings. The received power and efficiency statistics for these prior tests are shown below in Tables 3 and 4:

TABLE III

Maximum received power at resonant frequency (mW)

| | No shield | Ferrite | Neodymium | Nickel-Iron | Nickel | Steel | Cobalt-Iron |
|---|---|---|---|---|---|---|---|
| Circular Coil | 19.69 | 95.87 | 19.78 | 98.30 | 92.66 | 96.31 | 99.41 |
| Helical Coil | 10.16 | 3.16 | 10.15 | 2.67 | 3.44 | 3.12 | 2.76 |
| DD Coil | 20 | 500 | 2 | 178 | 343 | 724 | 970 |
| Layer DD Coil | 2.933 | 276.36 | 2.93 | 88.42 | 190.56 | 373.65 | 475.93 |
| Square Coil | 0.028 | 0.56 | 0.0007 | 0.0042 | 0.086 | 0.077 | 0.024 |

TABLE IV

| | No Shield | Ferrite | Neodymium | Nickel-Iron | Nickel | Steel | Cobalt-Iron |
|---|---|---|---|---|---|---|---|
| Circular Coil | 0.00167 | 0.1632 | 0.001919 | 0.06214 | 0.035824 | 0.2266 | 0.026395 |
| Helical Coil | 0.0056 | 0.000622 | 0.0186 | 0.0107 | 0.000633 | 0.000064 | 0.000059 |
| DD Coil | 0.0137 | 9 | 0.007 | 2.88555 | 5.067 | 10.607 | 6.0581 |
| Layer DD Coil | 8.55 | 25.3 | 0.004 | 1.8 | 9.91 | 8.196 | 8.74 |
| Square Coil | 0.000005 | 0.001341 | 0.000002 | 0.000006 | 0.00001 | 0.000234 | 0.000035 |

As can be seen in Tables III and IV, while the Layered DD coil in the prior experiment, with oppositely wound coil windings, showed similar efficiencies in some scenarios to the single layer DD coil, the DD coil actually transferred more power to the receiver coil than the LLD coil in that experiment. Thus, a significant performance improvement is achieved, as demonstrated in Tables I and II, by winding the coil windings in each coil layer of the wireless power transfer device 10 in the same rotational direction with respect to the direction of current flow through the coil windings, as taught herein. This is particularly true of as the range of distance between the transmitter coil and receiver coil is increased, wherein the power transmission of the LDD coil of the present disclosure was an order or magnitude greater than the power transmission of the single layer DD coil, and the efficiency of the LDD coil was often more than double that of the DD coil depending on the shielding material utilized.

Figure 5A:
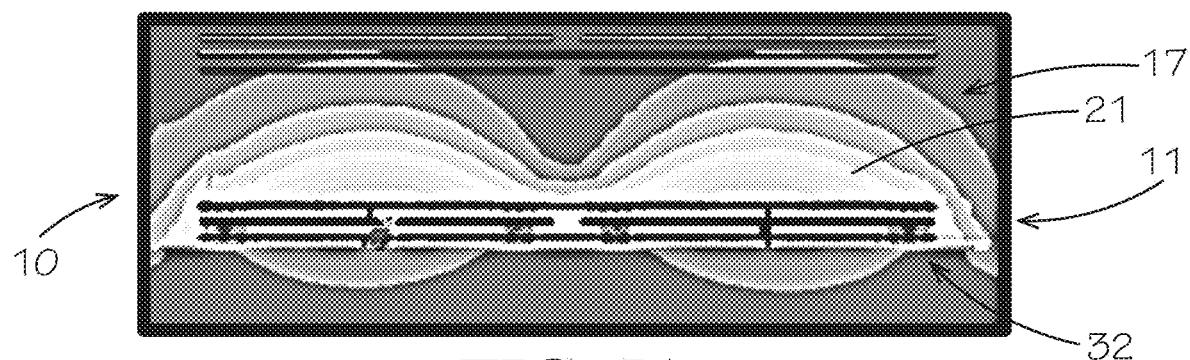
FIG. 5 shows the magnetic field distributions around various wireless power transfer devices of the current disclosure including (a) a ferrite shield only at the transmitter side of the transfer device; (b) a ferrite shield on both the transmitting and receiving side of the transfer device; (c) an aluminum shield on the transmitting side only of the transfer device; and (d) an aluminum shield on both the transmitting and receiving side of the transfer device.
Figure 5B:
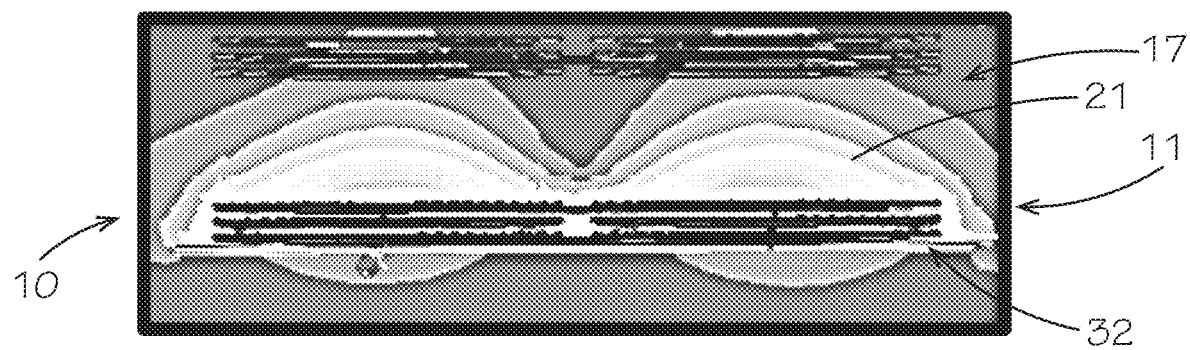
Figure 5C:
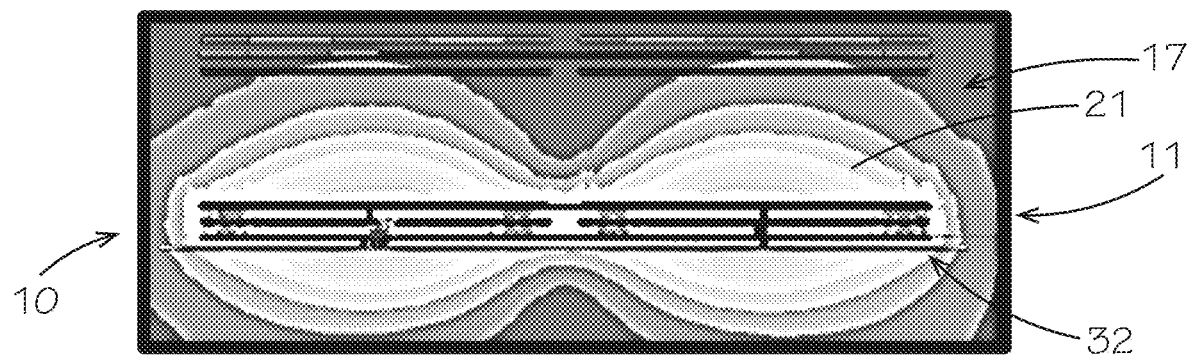
Figure 5D:
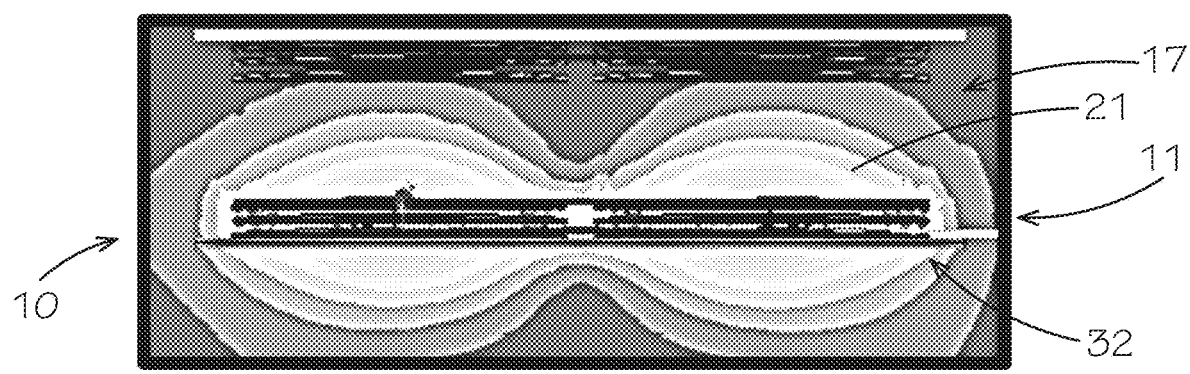
Figure 6:
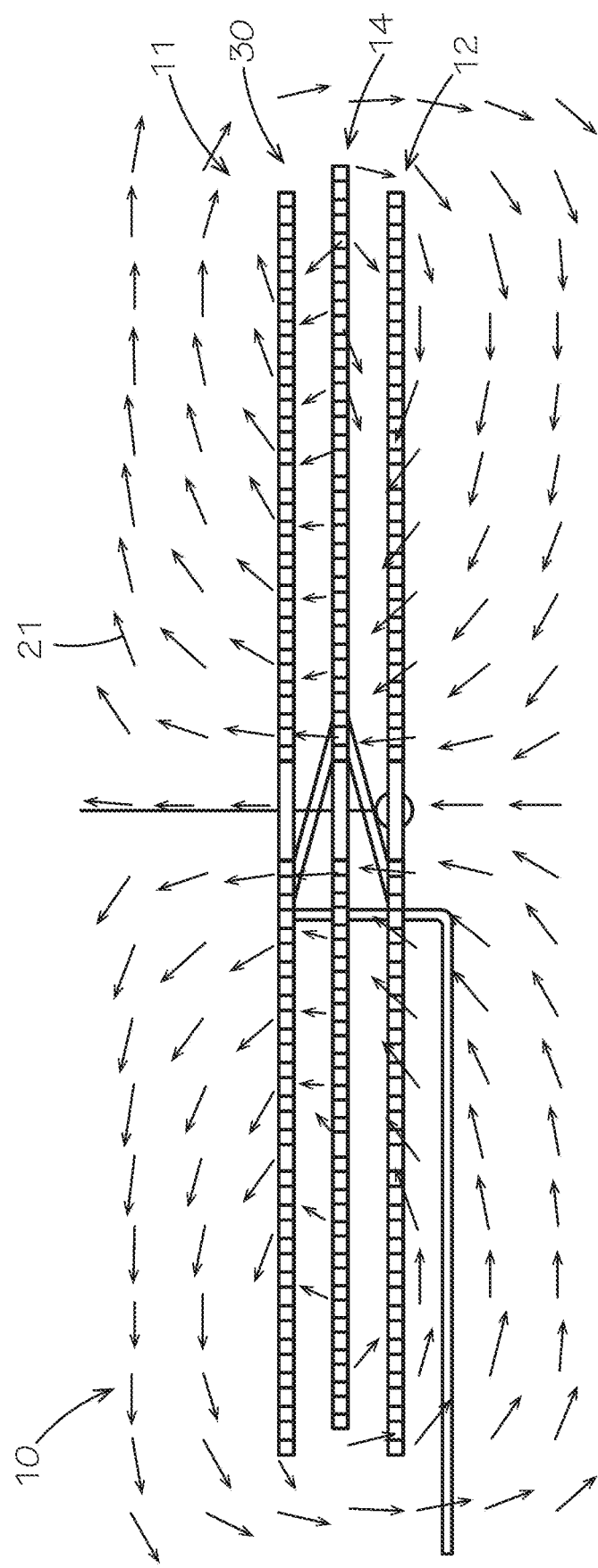
FIG. 6 is a side view of the magnetic field distribution around the wireless power transfer device of FIG. 1.

Referring now to FIGS. 4-6, front and side view of the magnetic field distribution around an embodiment of the LDD coil with and without a shielding, as modeled in ANSYS Maxwell, can be seen. Notably, it can be observed that the overall magnetic field of the LDD coil converges above the LDD coil as opposed to being uniformly distributed around it. Due to the constructive interference of the magnetic field 21, the directed flux lines converge above the LDD coil and gravitate towards the center of the LDD coil shown in FIGS. 4-5. The mutual inductance between the LDD coil's layers 12, 14, and 30 is also constructive and in the upward direction or a direction toward the receiver coil 17, thereby leading to an inductance value that is typically greater than three times the mutual inductance of a similarly situated DD coil, which in turn means the LDD coil provides a better efficiency than the DD coil.

While shielding materials help minimize the leakage of magnetic flux into the surrounding environment, they also play a pivotal role in increasing the power transfer efficiency of a coil structure. In both the modeling of the ANSYS Maxwell virtual simulation and the physical experimentation, ferrite and aluminum sheets were used as shielding to determine their effects on the self-inductance, mutual inductance, and transmitting efficiency of the LDD coil 10. In some embodiments, ferrite can be used as a shield only at the transmitter coil site (FIG. 5 (a)), while in others, ferrite can be used as a shield at both the transmitter and receiver sides (FIG. 5(b)). In some other embodiments aluminum shielding can be used as a shield on the transmitting side only (FIG. 5(c)), or on both the transmitting and receiving sides (FIG. 5(d)). It was found that the LDD coils had a more consistent performance when ferrite was used as a shield. The efficiency of power transfer at the resonant frequency was consistently better in ferrite than aluminum and air. By using ferrite as the shield, the magnetic field formed around the coil maintains a more consistent pattern, as seen in FIGS. 5(a) and 5(b). This ensures consistency in its performance both at resonance and at maximum power transfer point. In the case of aluminum, this consistency was not observed. It was observed that the aluminum shield does not affect the magnetic field as it can be seen covering the space around the coil. The performance experienced by the aluminum shield can be attributed to the fact that current was also induced in the shield since aluminum is conductive. This current in turn generates a magnetic field around itself to oppose its source, and as a result, the overall magnetic field is reduced—impacting how much power gets induced in the receiver and the overall efficiency of the system.

From the overall theoretical and experimental results obtained through both the virtual and physical simulations, the LDD coil structure with ferrite shielding gave the best performance due to the constructive interference of the magnetic field. Also, the LDD coil configuration with ferrite shielding only on the transmitter side yielded the highest wireless power transfer performance, making it incredibly suitable for next generation wireless power transfer applications.

Thus, although there have been described particular embodiments of the present invention of a new and useful layered DD coil for wireless power transfer applications, it is not intended that such references be construed as limitations upon the scope of this invention.

What is claimed is:

1. A wireless power transfer device, comprising:
a transmitter coil comprising a first coil layer and a second coil layer, each coil layer including two coil windings, each coil winding wound about an axis;
wherein the axes are parallel to each other; and
wherein each coil winding is connected in series and wound in the same rotational direction with respect to the direction of current flow through each coil winding.

2. The wireless power transfer device of claim 1, wherein the first coil layer and the second coil layer are stacked on top of one another.

3. The wireless power transfer device of claim 1, wherein the two coil windings of the first coil layer are vertically aligned with the two coil windings of the second coil layer.

4. The wireless power transfer device of claim 1, wherein the transmitter coil is connected to a power source.

5. The wireless power transfer device of claim 1, wherein the transmitter coil is configured to transfer power to one or more receiver coils via induction when the one or more receiver coils are proximate to magnetic fields generated by the transmitter coil.

6. The wireless power transfer device of claim 1, wherein each coil winding is wound in a clockwise direction with respect to the direction of current flow through each coil winding.

7. The wireless power transfer device of claim 1, wherein each coil winding is wound in a counterclockwise direction with respect to the direction of current flow through each coil winding.

8. The wireless power transfer device of claim 1, further comprising a receiver coil spaced apart from the transmitter coil and comprising a first coil layer and a second coil layer, each coil layer including two coil windings, each coil winding wound about an axis, wherein the axes are parallel to each other.

9. The wireless power transfer device of claim 1, further comprising a magnetic shield layer located adjacent to one of the first coil layer or the second coil layer.

10. The wireless power transfer device of claim 9, wherein the magnetic shield layer is made of ferrite.

11. The wireless power transfer device of claim 9, wherein the magnetic shield layer is made of aluminum.

12. The wireless power transfer device of claim 9, further comprising a receiver coil spaced apart from the transmitter coil, and wherein the magnetic shield layer is located on a side of the transmitter coil opposite the receiver coil.

13. The wireless power transfer device of claim 12, further comprising a receiver magnetic shield layer positioned on a side of the receiver coil opposite from the transmitter coil.

14. The wireless power transfer device of claim 1, wherein the first coil layer and the second coil layer are connected in series.

15. The wireless power transfer device of claim 1, wherein the first coil layer and the second coil layer are connected in parallel to each other on parallel electrical paths.

16. The wireless power transfer device of claim 1, wherein the first coil layer is powered by a first power source and the second coil layer is powered by a second power source.

17. The wireless power transfer device of claim 1, wherein all coil windings are wound in the same rotational direction with respect to the direction of current flow through the coil windings, such that the coil windings in each corresponding coil layer produce a diverging magnetic field in a direction transverse to a lateral direction, and the magnetic field produced in each coil layer interferes constructively with the corresponding magnetic field produced by the corresponding coil windings of the other coil layer.

18. A wireless power transfer device, comprising:

a transmitter coil comprising a first coil layer, a second coil layer, and a third coil layer, each coil layer including two coil windings, each coil winding wound about an axis;

wherein the axes are parallel to each other; and wherein the first coil layer, the second coil layer, and the third coil layer are stacked on top of one another.

19. The wireless power transfer device of claim 18, wherein all coil windings are connected in series and wound in the same rotational direction with respect to the direction of current flow through the coil windings, such that the coil windings in each corresponding coil layer produce a diverging magnetic field in a direction transverse to a lateral direction, and the magnetic field produced in each coil layer interferes constructively with the corresponding magnetic field produced by the corresponding coil windings of the other coil layer.

20. A wireless power transfer device, comprising:

a receiver coil comprising a first coil layer and a second coil layer, each coil layer including two coil windings, each coil winding wound about an axis;

wherein the axes are parallel to each other;

wherein each coil winding is connected in series and wound in the same rotational direction with respect to the direction of current flow through each coil winding; and wherein the receiver coil is spaced apart from a transmitter coil.

* * * * *